United States Patent

[11] 3,616,189

[72] Inventor George B. Harr
 Pasadena, Calif.
[21] Appl. No. 787,300
[22] Filed Dec. 17, 1968
[45] Patented Oct. 26, 1971
[73] Assignee Firestone Tire & Rubber Company
 Akron, Ohio
 Continuation-in-part of application Ser. No. 413,763, Nov. 25, 1964, now abandoned, which is a continuation of application Ser. No. 357,499, Apr. 6, 1964, now abandoned.

[54] LIQUID CONTAINER CELLS WITH CURED NITRILE INNER LAYER AND CURED POLYETHER-POLYURETHANE ELASTOMER OUTSIDE LAYER
 7 Claims, 6 Drawing Figs.
[52] U.S. Cl.................................................. 161/190,
 150/0.5, 161/256, 161/405, 280/5
[51] Int. Cl....................................................... B32b 27/40,
 B32b 27/40, A45c /00

[50] Field of Search........................................... 413/763;
 357/499; 161/405, 190, 256; 150/0.5

[56] References Cited
 UNITED STATES PATENTS

| | | | |
|---|---|---|---|
| 2,558,807 | 7/1951 | Bailey.......................... | 161/405 X |
| 2,626,882 | 1/1953 | Gerke........................... | 161/405 X |
| 2,713,550 | 7/1955 | Reid et al..................... | 161/405 X |
| 2,715,085 | 8/1955 | Boger........................... | 161/405 X |
| 3,129,014 | 4/1964 | Hutchinson et al............ | 280/5 |
| 3,177,090 | 4/1965 | Bayes et al................... | 117/72 |
| 3,205,120 | 9/1965 | Flanders....................... | 161/190 X |

Primary Examiner—John T. Goolkasian
Assistant Examiner—C. B. Cosby
Attorneys—S. M. Clark and Willard L. G. Pollard ABSTRACT: Fuel cells are made with cured nitrile rubber on the inner surface and cured polyurethane on the outer surface. A nylon barrier may be provided between the two. The polyurethane layer is preferably prepared by spraying a curing agent and polyurethane precursor through a nozzle which mixes the two.

PATENTED OCT 26 1971 3,616,189

LIQUID CONTAINER CELLS WITH CURED NITRILE INNER LAYER AND CURED POLYETHER-POLYURETHANE ELASTOMER OUTSIDE LAYER

This application is a continuation-in-part of my application Ser. No. 413,763 filed Nov. 25, 1964 which, in turn, is a continuation of my application Ser. No. 357,499 filed Apr. 6, 1964 (now abandoned).

This invention relates to an improved fuel cell for automobiles, airplanes, boats, etc.

The fuel cell contains a nitrile rubber (butadiene-acrylonitrile copolymer) inner liner associated with a nylon film barrier and a polyurethane exterior. The fuel cell may be of the bullet sealing type if desired.

All-polyurethane cells with and without a barrier of nylon between the plies thereof have been made. Difficulty has been experienced with those cell structures which provide an inner surface of polyurethane which is contacted by the fuel and with water present in the fuel. On prolonged contact with the fuel and/or with water in the fuel, the polyurethane degrades. Multiply polyurethane cells with barrier and single-ply cells of polyurethane have proven to be not sufficiently resistant to water to be satisfactory, and on prolonged use they have a tendency to degrade and/or may delaminate. Fuel cells with polyurethane inner liners generally will not comply with current U.S. Military specifications. The fuel cell of this invention overcomes these difficulties.

The fuel cell of this invention contains a compounded nitrile polymer inner liner. It includes an outer ply of polyurethane, an inner ply of a nitrile rubber, and a nylon barrier between these. In some cases the nylon barrier may be omitted. The cell walls are generally sufficiently flexible to permit collapsing for installation, yet possess a degree of spring back. An extended application would be to encase the exterior with a polyurethane compound having sufficient rigidity to be semirigid or self-sustaining. A further useful type of cell includes a sealant ply for self-sealing tanks for the military.

The cell may be built up in any suitable manner. For instance, the cell may be built by plying up tailored sheets of the (several) laminae upon a building form. Alternatively, one or more of the plies may be built up by application of them as liquids to a form, this being described in the case of polyurethane laminae in Hutchison et al. Ser. No. 60,975 filed Oct. 6, 1960 which has matured into U.S. Pat. No. 3,129,014 issued Apr. 14, 1964, or they may be individually preformed. The nitrile rubber and nylon barrier layers (this latter may in some cases be omitted) may also be applied as a liquid, as by brushing, spraying, etc., these materials in liquid form, e.g. as solutions, dispersions, etc., to a preformed ply or sprayed coat of the nitrile rubber. Generally, an adhesive bond, a primer is applied between the plies. The assembled cell is then heated, with or without accompanying applied pressure, to cure these elastomers, cements and plastics and to simultaneously bond the different plies together.

The nitrile rubber is fuel and water resistant when cured. This ply is composed essentially of a copolymer of a major portion of butadiene and a minor portion of acrylonitrile, usually in the ratio of about 57/55 percent butadiene to 25/45 percent of acrylonitrile. Such rubbers are available commercially under such names as Butaprene N, Chemgum N, Hycar and Paracril. The curing of these rubbers with sulfur, etc. is well known is the art.

The polyurethane may be obtained from a variety of different precursors. That known as Adiprene L-100 is a fully saturated polymer which contains 4.0 4.3 percent of isocyanate groups, by weight, the balance being at least largely a polytetramethylene ether glycol of medium chain length of about 30 to 40 oxygen atoms reacted with tolylene isocyanate.

Adiprene L-167 is of like composition but contains 6.2 to 6.5 percent isocyanate content. Other polyurethane precursors which may be used would be Multrathane, Adiprene LD-315, etc.

To the polyurethane precursor are added curing agents and modifying agents. Suitable curing agents are amine-type compounds such as methylene dianiline diamino pyridine, triethylene tetramine, hexamethylene diamine and the like. Also beneficial are modifying agents, such as phenoxy resins of the Bisphenol A/epichlorhydrin variety. These latter two materials serve the dual purpose of increasing the deposited film viscosity to permit depositing thicker films without difficulties from sagging and in part serving as cross-linking agents in the curing of the polyurethane rubber. Typical additives are as follows:

| Technical Name | Trade Name | Source |
|---|---|---|
| 4,4'Methylene-bis(2-chloroaniline: | MOCA | DuPont* |
| Diaminodiphenylsulfone | | |
| Diaminodiphenylamine | | |
| 4,4'-Diaminobenzophenone | | |
| Diaminopyridine | | |
| Meta-phenylenediamine | | |
| Cumenediamine and | Curing Agent Z | Shell** |
| m-phenylenediamine | DPI-7 | |
| Liquid Polyamide | Versamid-100 | General*** |
| Liquid Polyamide | Versamid-115 | General*** |
| Liquid Polyamide | Versamid-125 | General*** |
| Hexamethylenetetramine | | |
| Triethylenetetramine | | |

*E. I. duPont deNemours & Company.

**Shell Chemical Corporation.

***General Mills Co.

Other curing agents include polyols (such as castor oil, 1,4-butanediol, 1,2,6-hexatriol, trimethyltolpropane, triethanolamine, N,N,N',N'tetrabis(2-hydroxypropyl)ethylenediamine, methyldiethanolamine and the like and combinations thereof), moisture and a miscellaneous list of catalysts, including lead and cobalt napthenates, potassium acetate, titanate esters, etc. The precursor is preferably a linear polyether similarly terminated with a small percentage of isocyanate groups. The method of manufacturing polyurethane, the precursors and the curing agents are all well known in the art.

Nylons suitable for use in the barrier film are of two types—alcohol soluble resins, such as duPont's Zytel 61 and Zytel 61P, which are presumed to be of the 6/610/6 variety, or Belding Corticelli Industries' 800 series nylon resins, which are methoxy-methylated nylon. These may have average molecular weights of 20,000 to 25,000 with melting points of 130° to 150° C. Alternatively, nylon film prepared from injection molding grade nylon of with Type 66 or a variety of modified Type 6, such as Fosta Grant nylon film, may be used.

The sealant used to make the tank bullet sealing may be of any usual type. Frequently these compositions employ a mixture of natural rubber and styrene-butadiene synthetic rubber in a compound exhibiting a very low state of cure. The state of cure is such that it does not interfere with the swelling of the sealant when exposed to fuel as a result of the passage of a projectile through the cell wall.

The composite is vulcanized and otherwise cross-linked, utilizing a heat and pressure system representing a delicate balancing of that required by the nitrile inner liner, the primer cements and the polyurethane outer ply. Temperatures ranging as high as 315° F. have been employed.

The shape of the cell is not critical. It will be provided with any suitable opening for filling, and connections for supplying fuel as required. The nylon barrier will usually be thin, about 0.001 to 0.002 inch. The polyurethane will usually range from 0.015 to 0.035 inch thick, depending on utilization, or somewhat thicker. Usually the nitrile rubber will be no thicker than about 0.02 inch thick, preferably on the order of 0.008 inch. The overall thickness of the cell walls will usually be about 0.030 to 0.060 inch, and up to 0.18 inch for self-sealing cells.

The invention is more particularly illustrated in the drawing, wherein the several figures are cross-sectional views of portions of cell walls constructed in accordance with this invention, the composition of the several laminae in each figure being indicated by legends. In the drawing.

Figure 1:
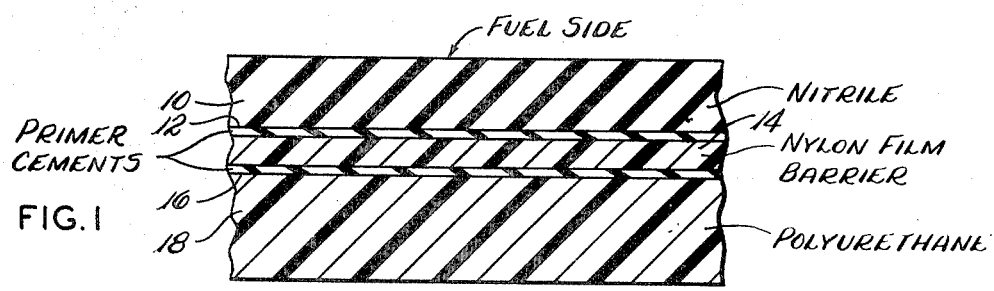
FIG. 1 is a section through a cell wall in which there is a nylon barrier but no fabric.

FIG. 1 illustrates one embodiment of the invention comprising an innermost lamina 10 of a nitrile rubber on the inner, fuel-contacting side of a fuel cell, this inner lamina 10 being bonded by means of a prime cement layer 12 to a continuous, nonporous nylon film barrier lamina 14. This lamina 14 is, in turn, bonded by means of a second primer cement layer 16 to an outermost supporting and encapsulating lamina 18 of a polyurethane elastomer. In the construction of a fuel cell embodying a wall of this construction, there will be provided a suitable building form having a surface conforming to the contour of the fuel cell to be constructed and being of such material as to accept the building of plies thereon. In one embodiment, sheets of uncured nitrile rubber composition containing the usual vulcanizing agents, pigments, etc. tailored to conform to the building form are plied upon the form, and all seams between the tailored pieces carefully closed and rolled down, this ply being the nitrile rubber ply 10 of FIG. 1. Thereafter, a solution of a primer cement 12 is applied onto the nitrile rubber lamina 10 and dried. The purpose of this primer cement is to insure the highest possible order of adhesion between the nitrile rubber and the nylon barrier lamina, such cements being known in the art, but in some cases it may be omitted. After the primer cement is applied, nylon film barrier 14. After the drying of the nylon film barrier 14, a second coat 16 of primer cement layer 16 a liquid polyurethane composition capable of setting up and curing to form the outermost structural and encapsulating layer 18. In accordance with one suitable mode of application, the liquid polyurethane composition is supplied as two separate components—(I) a curing agent and phenoxy resin system and (II) a liquid polyurethane precursor—which are mixed in a dual component spray gun immediately before being projected upon the surface of the fuel cell under construction. The two separate components may be as follows:

(I) Curing agent and Phenoxy Resin Cross-Linking System.

| | |
|---|---|
| Methylene Dianiline | 39.6% |
| Estane 5740X2 Polyurethane | 3.2% |
| Phenoxy Resin PKDA 8500 | 11.9% |
| Dianisidine Diisocyanate | 1.0% |
| Methyl Ethyl Ketone | 36.4% |
| Methyl Isobutyl Ketone | 7.9% |

The polyurethane (II) may be, for example, Adiprene L–100, which was described hereinabove on page 3 on this specification. This composition is quite desirable as it enables the spraying of laminae of fairly substantial thickness without sagging. Typically, the nitrile rubber inner layer 10 would have a thickness of 0.008 inch, the primer cement layers 12 and 16 thicknesses of 0.001 inch, the nylon film barrier 14, a thickness of 0.002 inch, and the polyurethane lamina a thickness of 0.010–0.030 inch. After construction of the above described composite cell, solvent is allowed to evaporate from the polyurethane layer 12 and the entire assembly is then subjected to heat curing in a pressure vulcanizer in an atmosphere is air at temperatures on the order of 280°–290° F. in order to cure the several laminae. It will be seen that the mode of construction of the fuel cell is quite inexpensive and simple, and the resultant fuel cell has excellent abrasion resistance, tear resistance, puncture resistance, and low-temperature flexibility. The interior of the cell is highly resistant to deterioration from fuel and water contained in the cell. The polyurethane precursor may be a polyether, in which the percentage of isocyanate groups may be larger or smaller. A suitable composition is the well-known adiprene L–100 which is a fully saturated polymer which contains 4.0 to 4.3 percent of isocyanate groups, by weight, the balance of the molecule being, at least largely, polytetramethylene ether glycol of medium chain length of about 30 to 40 is reacted with a diisocyanate to produce the precursor.

A rapid curing agent is used, such as MOCA which is 4,4'-methylene-bis(2-chloroaniline). This is mixed with the precursor in the spray gun, together with the viscosity builder. A good viscosity builder is a soluble thermoplastic copolymer of Bisphenol A and epichlorhydrin. This will cross link with the precursor. A small amount of a soluble thermoplastic polyurethane may be added, together with sufficient diisocyanate to cure it. A suitable formula for 100 parts of Adiprene L–100 precursor is:

| | |
|---|---|
| Curing Agent: | |
|   MOCA | 14.3 parts |
| Viscosity Builder: | |
|   Soluble thermoplastic polyurethane | 1.02 parts |
|   Dianisidine diisocyanate | 0.37 parts |
|   Thermoplastic copolymer of | |
|   Bisphenol A and epichlorhydrin | 5 parts |
| solvents: | |
|   Ethyl acetate | 5.7 parts |
|   Methylethyl ketone | 13.2 parts |
|   Methylisobutyl ketone | 2.69 parts |

The various components are mixed in the spray gun and sprayed on to the surface of the cellular interior. The sprayed coating cures rapidly at room temperature.

Figure 2:
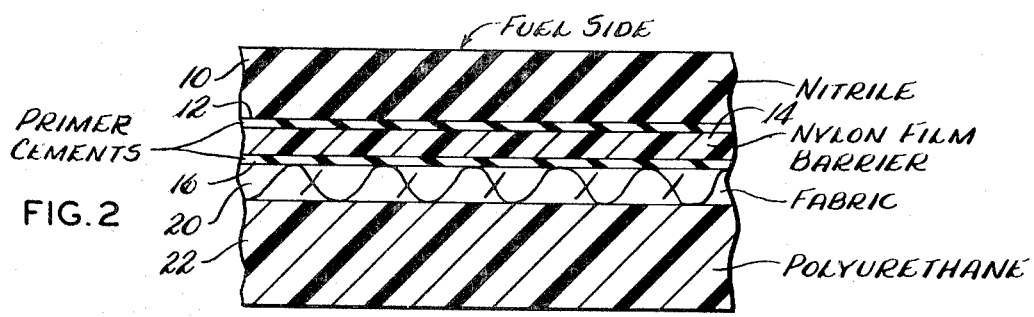
FIG. 2 is a section through a cell wall showing both a nylon barrier and fabric.

FIG. 2 shows another modification of this invention comprising, as before, a nitrile rubber layer 10 on the interior side of the wall, primer cement layers 12 and 16, and nylon barrier film 14. However, at this point there is introduced a fabric-reinforced elastomer ply 20 and superimposed upon this lamina a final polyurethane lamina 22. The method of construction of this fuel cell may follow the same procedure as in the case of FIG. 1 up to the application and drying of the primer cement lamina 16. At this point there is applied to the structure on the form tailored sheets of fabric 20 which may or may not be impregnated with a suitable elastomer, either polyurethane or nitrile rubber. Finally, a liquid polyurethane composition similar to that employed in FIG. 1 is sprayed upon the entire structure to form the outermost lamina 22, and the entire assembly cured as in the case of FIG. 1 In the case where the fabric 20 is not already impregnated, the fabric and bond to the substrate.

Figure 3:
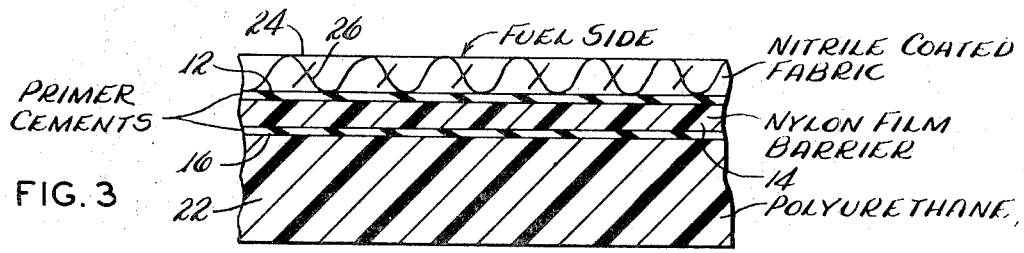
FIG. 3 is a section through a cell wall in which the fuel side is nitrile-coated fabric.

Fig. 3 is identical with FIG. 1 except that, instead of a simple nonreinforced innermost nitrile rubber layer 10, there is employed a nitrile rubber composition sheet 24 containing a fabric reinforcement 26 embedded therein. The method of construction, curing, etc. is identical as in the case of FIG. 1. The fabric reinforcement 26 is FIG. 3 serves the same purpose of imparting additional strength and rigidity as the fabric reinforcement in the lamina 20 of FIG. 2.

Figure 4:
FIG. 4 is a section through a cell wall in which no nylon barrier is used.

FIG. 4 represents the invention in its simplest form, wherein a nitrile rubber lamina 28 on the interior side of the fuel cell is laminated directly to a polyurethane rubber exterior lamina 30. In this case the nitrile rubber layer 28 is formed similarly to the lamina 10 to FIG. 1 by plying sheets of a nitrile rubber upon a form. Thereafter the polyurethane lamina 30 is sprayed upon the exterior surface of the nitrile rubber lamina 28 and the entire assembly cured as in the case of FIG. 1.

Figure 5:
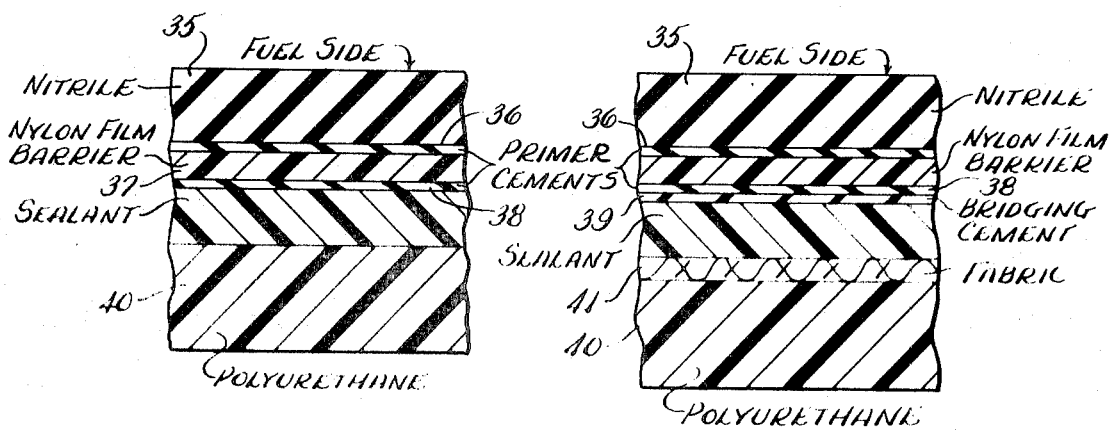
FIG. 5 is a section through a cell wall in which sealant is interposed between the outer polyurethane coating and the nylon barrier.
Figure 6:
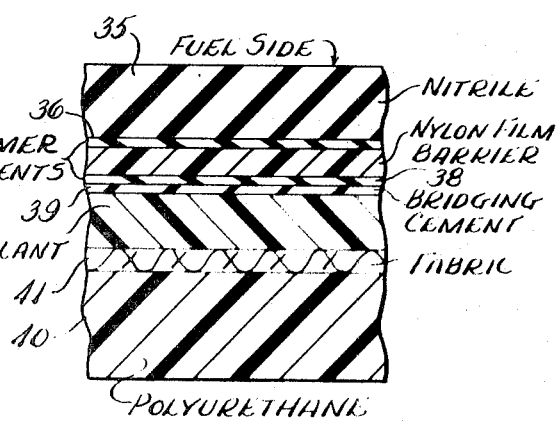
FIG. 6 is a section through a cell wall of similar construction but utilizing cloth between the sealant and the outer covering of polyurethane.

The cell walls shown in FIGS. 5 and 6 include a sealant ply. The location of the sealant is optional except that in tanks of the type contemplated by the industry at this time, the sealant is located outside of the nylon barrier. The cement shown between the nylon barrier and sealant may not be necessary, and if a cloth lamina is employed its location may be varied. It may, for example, be interposed between two sealant laminae or it may be interposed between the sealant and the polyurethane exterior. Adhesives will be used as required.

In the wall of FIG. 5, the nitrile liner 35 constitutes the interior of the fuel tank. This nitrile liner is prepared with primer cement 36 to accept the nylon barrier 37 which is applied in the form of a solution which dries to form a fuel-impervious film barrier. After the nylon film barrier 37 is properly dried, a second primer cement 38 is applied and allowed to dry. A third cement 39 is a bridging cement applied on top of cement 38 to insure adherence of the sealant to the nylon. The fuel-swelling sealant is then applied to the buildup and this may be a single layer as shown, or it may be composed of several layers, according to the level of gunfire protection desired. The final encasement of this fuel tank construction is accomplished by applying an outer polyurethane casing 40, said casing being particularly resistant to the shattering effect of the impact of projectiles. In addition, the outer polyurethane casing or integument possesses the characteristic of snapback which realigns the lips of inflicted wounds; this realignment is particularly necessary in the proper functioning of bullet-sealing fuel tanks.

FIG. 6 is quite similar to FIG. 5 with the exception that a cloth layer 41 is interposed between the sealant ply and the outer polyurethane ply.

In the self-sealing tanks, the polyurethane forms a particularly desirable outer ply (not necessarily at the surface of the cell) because when pierced by a projectile, the polyurethane does not shatter or tear (as does cloth alone and other materials of the prior art). Also the polyurethane imparts exceptional snap0back to the entire self-sealing construction, thereby realigning the lips of the wound, permitting the sealant to perform in optimum fashion.

It is understood that FIGS. 5 and 6 typify only two of a number of possible variations, but the approaches shown here do include the basics of all constructions employing an inner liner, a nylon barrier, a sealant, and an outer casing, all joined with suitable cements.

I claim:

1. A fuel cell of laminated wall construction, the inner surface of which is essentially cured butadiene-acrylonitrile rubber and the outer surface of which is essentially cured elastomeric fully saturated polyether polyurethane, the ratio of the butadiene to acrylonitrile in said rubber being 75 to 55 parts by weight of butadiene to 25 to 45 parts of acrylonitrile, the wall possessing a degree of snapback which tends to render it self sealing.

2. The fuel cell of claim 1 in which the butadiene-acrylonitrile rubber is formed from a solution.

3. The fuel cell of claim 1 in which the butadiene-acrylonitrile rubber is preformed.

4. The fuel cell of claim 1 in which said polyurethane is adjacent said butadiene-acrylonitrile rubber.

5. The fuel cell of claim 4 which is reinforced with fabric between the polyurethane and the butadiene-acrylonitrile rubber.

6. The fuel cell of claim 1 in which a barrier layer of nylon is interposed between said polyurethane and said butadiene-acrylonitrile rubber and adhered thereto by adhesive.

7. The fuel cell of claim 1 in which the butadiene-acrylonitrile rubber layer is substantially 0.008 inch thick, each adhesive layer is substantially 0.001 inch thick, the polyurethane layer is substantially 0.015 to 0.035 inch thick and there is a nonporous nylon barrier about 0.001 to 0.002 inch thick between the butadiene-acrylonitrile rubber and the polyurethane.

* * * * *

PO-1050
(5/69)

UNITED STATES PATENT OFFICE
CERTIFICATE OF CORRECTION

Patent No. 3,616,189      Dated Oct. 26, 1971

Inventor(s) George B. Harr

It is certified that error appears in the above-identified patent and that said Letters Patent are hereby corrected as shown below:

Col. 1, line 58
    "57" should be -- 75 --

Col. 1, line 62
    after "well known" the word "is" should be -- in --

Col. 1, line 65
    the word "to" should be inserted between 4.0 and 4.3

Col. 2, line 15
    after the word "chloroaniline" a parenthesis should be inserted instead of the colon now there Col. 2, line 35
    "tetrabis" should be -- tetrakis --

Col. 2, line 52
    "with" should be -- either --

Col. 3, line 43, after "applied" insert -- a solution of nylon is applied over the primer cement layer 12 and dried, in order to form the impervious --.

UNITED STATES PATENT OFFICE
CERTIFICATE OF CORRECTION

Patent No. 3,616,189         Dated Oct. 26, 1971

Inventor(s) George B. Harr

It is certified that error appears in the above-identified patent and that said Letters Patent are hereby corrected as shown below:

Col. 3, line 65
  "on" second occurrence should be -- of --

Col. 4, line 1
  "is" should be -- of --

Col. 4, line 15 and line 16 should read:
  -- glycol of medium chain length of about 30 to 40 oxygen atoms. This is reacted with a diisocyanate to produce the precursor. --

Col. 4, line 57
  "After FIG. 1" should be inserted a "period (.)"

Col. 4, line 57 (starting with "In the ")
  the complete sentence should read:
  -- In the case where the fabric 20 is not already impregnated, the polyurethane composition strikes through to impregnate the fabric and bond to the substrate. --

Col. 4, line 65
  "is" should be -- in --

Col. 4, line 72
  "to" should be -- in --

Col. 5, line 37
  "snap0back" should read --snap-back --

Signed and sealed this 27th day of February 1973.

(SEAL)
Attest:

EDWARD M. FLETCHER, JR.
Attesting Officer

ROBERT GOTTSCHALK
Commissioner of Patents